United States Patent Office 3,387,937  
Patented June 11, 1968

3,387,937  
PROCESS FOR THE MANUFACTURE OF IRON-FREE PHOSPHORUS PENTASULFIDE  
Hermann Niermann, Bruhl, near Cologne, Helmuth Klee and Wilhelm Forst, Knapsack, near Cologne, and Joseph Cremer, Hermulheim, near Cologne, Germany, assignors to Knapsack Aktiengesellschaft, Knapsack, near Cologne, Germany, a corporation of Germany  
No Drawing. Filed Nov. 19, 1965, Ser. No. 508,853  
Claims priority, application Germany, Dec. 5, 1964, K 54,714  
5 Claims. (Cl. 23—206)

ABSTRACT OF THE DISCLOSURE

A process for preparing substantially iron-free phosphorus pentasulfide by contacting phosphorus with a continuous stoichiometric excess of sulfur in the reaction mixture at reduced temperature up to about 380° C.

---

The present invention relates to a process for the manufacture of phosphorus pentasulfide.

In copending U.S. patent application Ser. No. 341,635 filed on Jan. 3, 1964, now Patent No. 3,342,552, by Hermann Niermann et al. there is described a process for making phosphorus pentasulfide by reacting phosphorus and sulfur, preferably with agitation, at a temperature above about 300° C.

This process discloses introducing the starting components into a reactor at a rate sufficient to obtain a reaction product with a phosphorus content of about 28.1 to 28.9% by weight, preferably of 28.2 to 28.4% by weight. The starting components are more especially introduced into the reactor at a rate sufficient to have sulfur in excess over the stoichiometric phosphorus proportion present in the reactor until all of the sulfur has been added, and the phosphorus balance portion is successively added. The reaction is preferably carried out at a temperature of 400 to 420° C. with the resultant formation of a final product including some contaminants, especially iron, which are undesirable especially when the $P_2S_5$ is made into other products, because they incur the formation of reaction products which are colored, have an unpleasant odor and optionally necessitate filtration to remove precipitated iron hydroxide or iron sulfide.

Carrying out the reaction in customary manner results in a final product having an iron content of about 140 to 150 parts per million. This is why "crude" $P_4S_{10}$ is generally distilled to produce $P_4S_{10}$ fairly free from iron and of pure yellow appearance.

The present invention is based on the observation that phosphorus pentasulfide free from metallic contaminants, especially iron, can be obtained by reacting phosphorus with sulfur at a temperature below 380° C., preferably within the range of 340 and 380° C.

While at a reaction temperature of 420° C. the iron content is as high as 140 parts per million, it is only 120 parts per million at 400° C. It has unexpectedly been found that the iron content decreases substantially within the temperature interval of 400 and 380° C. to become practically meaningless at a temperature below 380° C.

The decreasing reaction temperature must, however, be expected to incur in homogeneities due to unsatisfactory reaction of the starting components phosphorus and sulfur. $P_4S_7$ and free sulfur are partially formed in the place of phosphorus pentasulfide as $P_4S_7$ is the thermodynamically most stable phosphorus sulfide.

The formation of $P_4S_7$ and hence of inhomogeneities in phosphorus pentasulfide can, however, be avoided by introducing phosphorus and sulfur into a reaction vessel at a rate sufficient to produce a reaction mass which during the introduction always contains a small sulfur excess of 2 to 10% by weight to permit immediate reaction of the phosphorus with the sulfur in excess resulting in $P_4S_{10}$. Very homogeneous phosphorus pentasulfide can then be obtained despite the reaction temperature being considerably lowered.

The yield of dimethyldithiophosphoric acid such as obtained by reacting $P_4S_{10}$ with methanol in accordance with the equation:

$$P_4S_{10} + 8CH_3OH \rightarrow 4(CH_3O)_2P(S)SH + 2H_2S$$

served as a measure determining homogeneity. The yield is indicated in percent, related to the theoretical yield of dimethyldithiophosphoric acid.

The following table indicates the data found at various temperatures for iron contaminants and the yields of dimethyldithiophosphoric acid obtained with the use of $P_4S_{10}$ prepared in the specific manner described above, i.e. under the specific metering conditions set forth above.

|  | Reaction temperature in °C. | | | | Commercial product (distilled) |
|---|---|---|---|---|---|
|  | 420 | 400 | 380 | 360 |  |
| Yield of dimethyldithiophosphoric acid, percent | 86.0 | 86.0 | 85.5 | 85.0 | 80 |
| Parts per million iron | 140 | 110 | 30 | 20 | 20 |

Example

Measured proportions of altogether 26.2 kg. yellow, liquid phosphorus and 66.3 kg. sulfur coming from measuring vessels were added, with agitation, to about 700 kg. liquid $P_4S_{10}$ having a temperature of 370° C. and placed in a reaction vessel. The sulfur was supplied within 20.5 minutes and the phosphorus was supplied within 21.2 minutes near the bottom portion of the vessel. The reactor walls were intensely cooled with air and the inside temperature of the reactor thereby maintained at about 370° C. The dimolecular $P_4S_{10}$ was removed through an overflow at the same rate at which the monomolecular phosphorus pentasulfide was formed near the bottom of the reactor. The measuring vessels when empty were filled again and additional quantities of phosphorus and sulfur were metered into the reactor. Liquid phosphorus pentasulfide withdrawn through the overflow was introduced into the heated basin of a dip roller, rapidly quenched on the cooled roller surface area, scraped off in scale-form and ultimately ground.

The finished ground product had an iron content of 22 parts per million and gave a 85.5% yield of dimethyldithiophosphoric acid.

What is claimed is:

1. In the process for making phosphorus pentasulfide by reacting phosphorus and sulfur at a temperature above about 300° C., wherein the starting components are introduced into a reactor at a rate sufficient to obtain a reaction product with a phosphorus content of about 28.1 to 28.9% by weight, and at a rate sufficient to maintain sulfur in excess over the stoichiometric proportion of phosphorus present in the reactor until all of the sulfur has been added, and the remaining phosphorus being added thereafter, the improvement which comprises carrying out the reaction at a temperature below 380° C. to obtain a product substantially free of iron.

2. The process of claim 1, wherein the reaction is carried out with agitation.

3. The process of claim 1, wherein the reaction product has a phosphorus content of 28.2–28.4% by weight.

4. The process of claim 1, wherein the reaction is carried out at a temperature of 340–380° C.

5. The process of claim 1, wherein the sulfur reactant in the reactor is utilized in a continuous stoichiometric excess of about 2–10% by weight with respect to the phosphorus reactant.

References Cited

UNITED STATES PATENTS

| | | | |
|---|---|---|---|
| 2,569,128 | 9/1951 | Jones | 23—206 |
| 3,205,041 | 9/1965 | Cremer et al. | 23—206 |

OSCAR R. VERTIZ, *Primary Examiner.*

G. T. OZAKI, *Assistant Examiner.*